April 23, 1935.  H. A. SHAW  1,998,641
SPRING SUSPENSION
Filed April 23, 1934  2 Sheets-Sheet 1
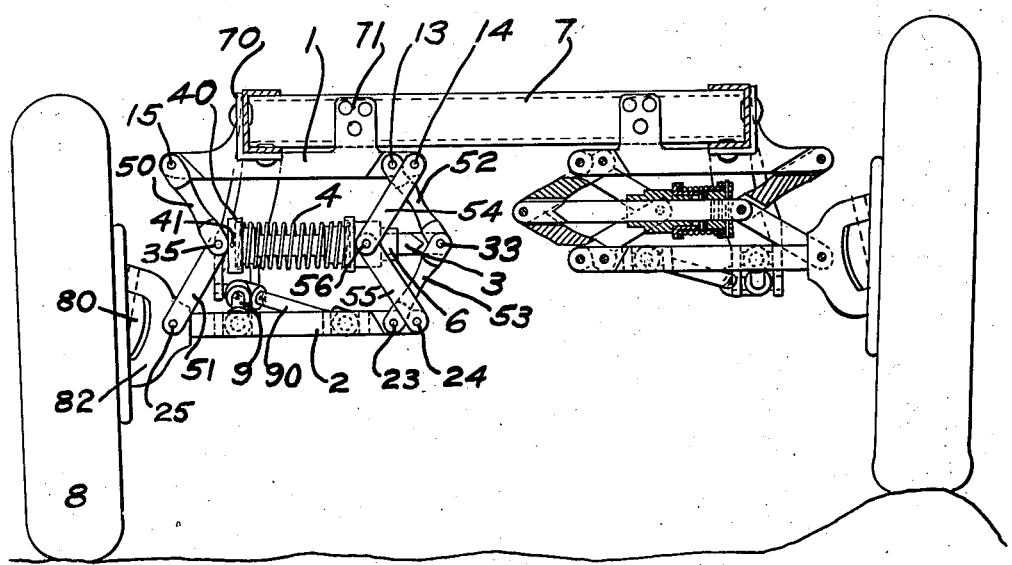
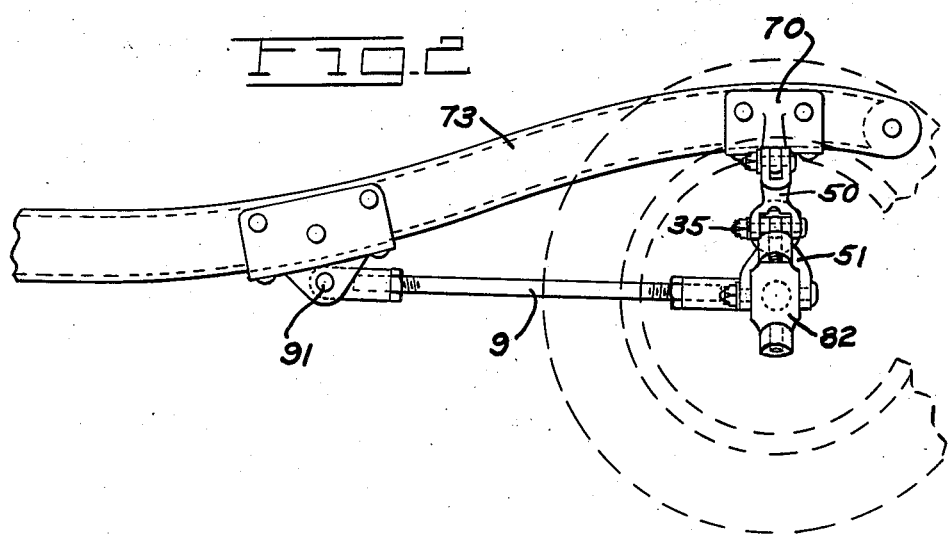
Inventor
*Harry A. Shaw*
By *Charles L. Reynolds*
Attorney

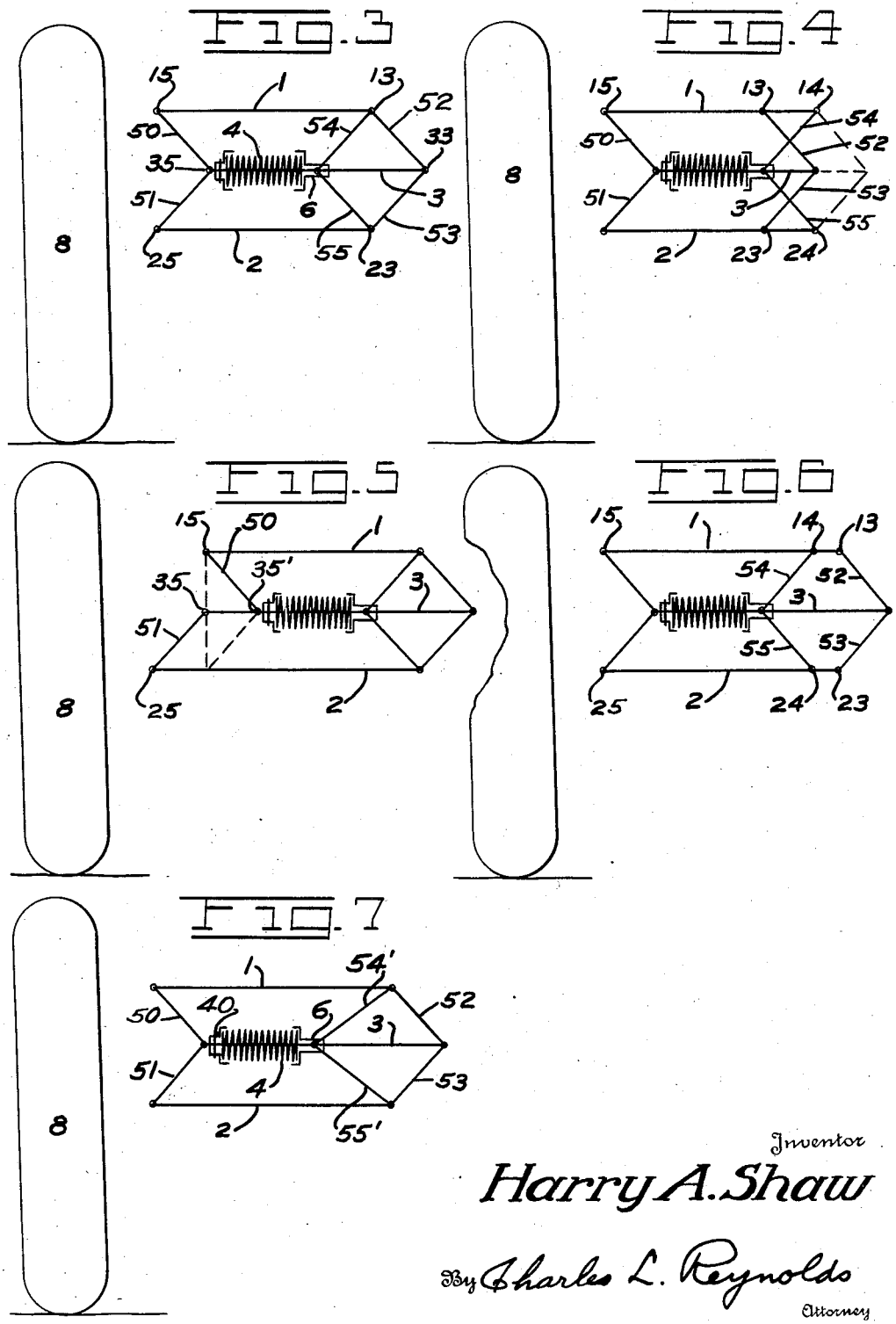

Patented Apr. 23, 1935

1,998,641

UNITED STATES PATENT OFFICE 1,998,641

SPRING SUSPENSION

Harry A. Shaw, Seattle, Wash.

Application April 23, 1934, Serial No. 721,889

11 Claims. (Cl. 267—20)

My invention relates to spring suspensions. It will be illustrated and described in connection with a spring suspension for the front wheels of an automobile, but it will be recognized that it may be employed in various ways and in various relations generally with respect to a supported mass and a support therefor.

It is an object of my invention to devise a spring suspension, by means of which a support, such as the front wheel of an automobile, can be supported independently of another support, such as the other front wheel, in such a way as to secure a number of advantages, not possible of securement, or only in limited measure, with present types of spring suspension. Among such advantages are the following: simplicity and low cost of construction; movement of the wheel precisely vertically at all times without any appreciable change in the caster, camber, or king pin inclination angle; safety, even in the event of collapse or breakage of the mechanism supporting one of the front wheels, in that the transverse frame member will tend to remain horizontal; automatic and inherent compensation for any wear occurring, so that all joints are kept tight and free from rattling; rigidity, inherent in the spring suspension, against any side play; greater clearance, if needed; breaking up the harmonics of the spring employed by the changing angle of incidence of certain link members; spring action in a precise straight line; the possibility of using a spring of a length considerably exceeding the spring employed in knee action suspensions, which therefore can be softer in its action; easy regulation of the tension of the spring; ready checking of rebound or incorporation of a shock absorber within the mechanism; the possibility of employment of a spring of greater or lesser length, as the design may require, without change in the basic design; resistance of an upward thrust from the road by the spring on one side, but resistance of rebound of the chassis downward by both springs, one at each side; the constant changing of the application of force and leverage through the entire action of the spring, making possible a softer action as the spring approaches complete compression; smooth compensatory action in meeting either lateral or direct road shocks; safety in rounding corners; less side thrust and strain on longitudinal members of the car frame; less rebound, bounce, or pitch.

These and other advantages, which will appear hereafter, flow from the principles of construction which are illustrated in the drawings, and which will be hereinafter described and claimed, and which constitute my invention.

In the accompanying drawings I have shown my invention embodied in illustrative forms.

Figure 1 is a front elevation, with parts shown in section, of independent spring suspensions for the opposite front wheels of a car. Figure 2 is a side elevation of the same.

Figures 3, 4, 5, 6, and 7 are diagrammatic illustrations of various modifications of the arrangement of my device.

Essentially the structure comprises an upper chord 1, a parallel lower chord 2, an intermediate chord 3, links joining the same in such a way as to maintain parallelism of the three chords, and a spring 4, preferably a compression spring, which is so interposed in the mechanism as to be compressed when the chords approach each other. While I shall described a compression spring, it will be apparent as the description progresses that an extension spring might be employed in lieu of the compression spring or jointly therewith, somewhat in the manner suggested, for example, in the Raaths Patent No. 1,180,185.

The connections between the chords referred to above comprise three pairs of links. One pair consists of the links 50 and 51, which are pivotally connected at 35, and which are pivotally connected, respectively, at 15 and 25 to the links 1 and 2. The pivotal connection at 35 connects also to the intermediate chord 3, and the links 50 and 51 extend inwardly of a line joining the pivots 15 and 25, to meet at an angle at the pivot connection 35. In addition there is a similar pair of links 52 and 53, pivotally connected to each other and to the intermediate chord 3 at 33, and to the chords 1 and 2 at the respective points 13 and 23. The links of this pair extend parallel to the links 50 and 51, and are the same in length. The third pair of links, 54 and 55, are pivotally connected at 56 to each other and to a slide 6, slidable lengthwise of the intermediate chord 3. The links 54 and 55 are pivotally connected, respectively, to the chords 1 and 2, and this connection may be at the points 13 and 23, as is shown in Figure 3, but as shown in Figure 1 the connection is made at points adjacent, indicated at 14 and 24. The links 54 and 55 extend oppositely to the links 52 and 53; that is, they extend inwardly toward the more distant links 50 and 51.

The spring 4 is shown as a compression coil spring. It surrounds the chord 3, thereby preventing any possibility of the spring buckling, whatever its length, and at one end rests in a cup formed as part of the slide 6, and at the other end is seated in a bearing member 40 which is secured to the chord 3 adjacent the point 35. However, it may be adjustable lengthwise of the chord 3 to adjust the static compression of the spring, and to this end a removable pin 41 is illustrated, passing through the bearing member 40 and the chord 3. If it is desired to use an extension spring, it might be connected between the points 56 and 33, alone or in conjunction with the compression spring as shown.

The chord 1 may extend from side to side of the car, or there may be separate chords for each side of the spring suspension. The chord 1 may be formed as the cross member of the chassis, but as shown herein the chord 1 is secured to the chassis cross member 7 by means such as the brackets and rivets, indicated at 70 and 71. In whatever manner this is formed the cross member may be likened to a rigid axle, and a force applied upward against the chord 2 may be likened to a downward force applied at one side or another of a somewhat flexible frame member. The arrangement, then, is somewhat similar to the now common arrangement with semi-elliptical springs, but inverted, and whereas in that arrangement the axle tended to remain horizontal, and the frame to weave somewhat, so in this arrangement the frame tends to remain horizontal within the limits of its rigidity, but the independent chords 2 may freely move vertically, but each chord 1 always maintains parallelism with the corresponding chords 2 and 3. In consequence the wheel 8, which is supported upon a spindle body 80 pivoted in turn upon the yoke 82, which is formed upon the end of, and at any level with respect to, the chord 2, remains and moves always precisely perpendicular. It has no swinging movement about a transverse arc, as is the case in many of the so-called knee action spring suspensions, and this in itself is a considerable factor in eliminating wear and in promoting safety. The arrangement of links and chords described is inherently rigid transversely; it cannot give in a transverse direction, and moreover, the spring serves to maintain all joints tight, if there should be some wear, although the number of joints and their accessibility, so far as I am aware, is somewhat less than in the independently sprung suspensions, and the arrangement is therefore more reliable.

It is obvious that such an arrangement is not inherently rigid in a longitudinal direction, that is, in a direction transverse to the plane defined by the chords 1, 2 and 3. Accordingly to brace the structure in this direction I provide a thrust or radius rod or rods, illustrated at 9 and 90, extending from a connection at 91 upon the longitudinal member 73 of the chassis to a connection with the lower chord 2. The movement brought about by the arc of swing of these radius rods 9 and 90 is less than half of an inch between the extremes of movement of the chord 2. This amount of play can be permitted in the bearings of the links, or can be accommodated by any suitable arrangement to this end. It will be noted that the longitudinal member 73 of the frame is preferably raised somewhat, in order to afford room for the movement of the spring suspension, but this is not objectionable; rather it permits the center of gravity to be dropped between the front and rear axles, as much as may be desired, and yet maintains the clearance at a point about equal with the center of the wheels, although the clearance is governed by the location of the spindle yoke 82 with relation to the chord 2, and may be varied at will by raising or lowering the position of the yoke.

The static condition of parts is illustrated at the left in Figure 1, with the spring 4 somewhat compressed, but with the chord 2 at somewhat less than its maximum distance apart from the chord 1. Upon striking a sudden bump in the road, parts will be compressed up to a limit shown at the right in Figure 1. The pivot connection 55 will approach the pivot connection at 35, causing compression of the spring 4, and since the amount of movement and the leverage, and consequently the force applied to the spring, will vary by reason of the changing angularity of the links, this change in leverage and in rate of application of the force will break up any harmonics of the spring which tend to cause bouncing or pitching, and a similar change as the spring again expands will, to a considerable extent, eliminate rebound. However, it will be obvious that a shock absorber might be connected in various places in the linkage or along the intermediate chord 3, and it is not outside the scope of my invention to include such a shock absorber.

I have shown the suspension applied only to the front wheels, but it will be apparent that it might be applied equally well to the rear wheels. Also, while it is shown only as extending generally transversely, it might, with equal facility, extend longitudinally of the car.

In the diagrams on the second sheet of drawings I have shown various arrangements of links, all of which incorporate my invention. For instance, in Figure 3 the links 54 and 55 are pivoted at the same points 13 and 23 as are employed for connection of the links 52 and 53 to the upper and lower chords, respectively. In Figure 4 there is illustrated the same general arrangement as is shown in Figure 1, and which has already been described. In Figure 5 the arrangement of Figure 3 has been modified by connecting the link 51 at the point 35, as before, but by shifting the connection of the link 50 along the chord 3 to a pivotal connection at 35'. Likewise the pivotal connection 15 of the link 50 to the upper chord 1 has been shifted inward an equal amount, so that in effect the lower chord 2 has been extended outwardly. This will permit connection of the wheel 8 to this lower chord without any possibility of interference of the outer end of the upper chord 1 with the tire, though ordinarily the camber angle of the wheel will prevent this. Of course, it is desirable to secure the wheel as nearly as possible to the point 25, so as to avoid the employment of a long unsupported lever arm.

In Figure 6 the arrangement is similar to that shown in Figure 4 except that the points 14 and 24 are now outside of the points 13 and 23, that is, between these latter points and the points 15 and 25.

The links of each pair are constantly changing angle with respect to each other and with respect to the chords, so that the leverage and application of force to the spring is likewise constantly changing. This breaks up the harmonic action of the spring, which is a factor in causing pitching and bouncing, and the action may be made more inharmonic by altering the lengths of certain links, particularly the links 54, 55. In the previous arrangement the links of the three pairs have been shown all equal in length. In Figure 7, however, the links 54' and 55' are shown as longer than the links of the other two pairs, and this will cause the slide 6 to approach the bearing member 40 at a rate somewhat more slowly than is caused when these links are equal to the other two pairs of links. This produces a difference in the rate of application of force and in the amount thereof as applied to the spring 4.

These arrangements are purely illustrative, and various other arrangements may be employed, as will now be apparent. It is desired to point out that the application of force at any point of the chord 1 or the chord 2 will cause movement of the chords toward or away from each other in precise parallelism, so that it is immaterial at what point the load bears upon the chord 1, or the force is applied to the chord 2. These members may be looked upon as the chords of a truss which is rigid as against lateral movement, though yieldable to the extent of permitting the several chords to approach one another.

Rebound is checked by reason of the fact that, considering the cross frame member 7 as rigid and horizontal, the complete upthrust of one side must react against the total inertia of the whole load, which will limit the violence of the frame's excursion, but the complete load comes down against both springs—one at each side—and the distribution or division of this rebound softens the force and violence thereof. There would thus be less bounce and side sway.

What I claim as my invention is:

1. A spring suspension comprising, in combination with a substantially horizontal chord connected to a supported mass, a parallel chord therebeneath, and connected to a support, a third parallel chord intermediate the two, a spring disposed lengthwise of the intermediate chord, means constraining the several chords to approach and recede from each other in parallelism, regardless of lateral stresses in the direction of any chord, and applying a force to said spring, upon approach of the chords, to move it lengthwise of the intermediate chord in resisting such force.

2. A spring suspension comprising, in combination with a substantially horizontal chord connected to a supported mass, a parallel chord therebeneath and connected to a support, a third parallel chord intermediate the two, a compression spring disposed lengthwise of the intermediate chord, means, in engagement with said spring, constraining the several chords to approach and recede from each other in parallelism, regardless of lateral stresses applied in the direction of any chord, and including elements movable towards each other upon approach of the chords, to compress the spring lengthwise of the intermediate chord.

3. A spring suspension comprising, in combination with a substantially horizontal chord adapted to support a mass, a parallel chord therebeneath adapted to engage a support, a third parallel chord intermediate the two, three pairs of links connecting the three chords, the corresponding links of two pairs extending in parallelism, and the corresponding links of the third pair extending oppositely, and slidably connected to the intermediate chord, to constrain the three chords to movement in parallelism in approaching or receding from each other, and a coil spring extending lengthwise of the intermediate chord, and connected to the third pair of links and to one of the other pairs, whereby its effective length is changed and a force is applied to it as the chords approach each other.

4. A spring suspension comprising, in combination with a substantially horizontal chord adapted to support a mass, a parallel chord therebeneath adapted to engage a support, a third parallel chord intermediate the two, three pairs of links connecting the three chords, the corresponding links of two pairs extending in parallelism, and the corresponding links of the third pair extending oppositely, and slidably connected to the intermediate chord, to constrain the three chords to movement in parallelism in approaching or receding from each other, and a coil spring extending lengthwise of the intermediate chord, and connected to the third pair of links and to the intermediate chord at a distant point, whereby its effective length is changed and a force is applied to it as the chords approach each other.

5. A spring suspension comprising, in combination with a substantially horizontal chord adapted to support a mass, a parallel chord therebeneath adapted to engage a support, a third parallel chord intermediate the two, three pairs of links connecting the three chords, the corresponding links of two pairs extending in parallelism, and the corresponding links of the third pair extending oppositely, and slidably connected to the intermediate chord, to constrain the three chords to movement in parallelism in approaching or receding from each other, and a coil spring extending lengthwise of the intermediate chord, and connected to the third pair of links and to the intermediate chord at a point adjacent the connection thereto of a distant pair of links, towards which the slidable connection of the third pair moves upon approach of the chords to each other, thereby to compress the spring.

6. A spring suspension comprising, in combination with a substantially horizontal chord adapted to support a mass, a parallel chord therebeneath adapted to engage a support, a third parallel chord intermediate the two, two pairs of equal links pivotally connected to the three chords, and corresponding links of each pair extending in parallelism, but the two links of each pair joining at an angle, a third pair of links pivotally connected to each other and slidably connected to the intermediate chord, and extending thence oppositely to the first-mentioned links, and pivotally connected, respectively, to the upper and lower chords at points adjacent the pivotal connection thereto of the links of one of the first-mentioned pairs, a compression coil spring interposed between the pivotal connection of the other of the first-mentioned pairs to the intermediate chord, and the slidable connection of the third pair.

7. The combination of claim 6, the third pair of links being equal in length to the first two pairs.

8. The combination of claim 4, the third pair of links being unequal in length to the first two pairs.

9. The combination of claim 4, the links of the third pair of links being longer than the links of the first two pairs.

10. A spring suspension comprising, in combination with a substantially horizontal chord adapted to support a mass, a parallel chord therebeneath adapted to engage a support, a third parallel chord intermediate the two, a slide movable lengthwise the intermediate chord, three pairs of links, the links of each pair being pivotally connected to each other, and respectively to the upper and lower chords, the links of two of the pairs being also pivotally connected to the intermediate chord, and extending respectively in parallelism, and the links of the third pair being pivotally connected to said slide, and extending oppositely to the links of the first two pairs, a compression coil spring extending lengthwise of the intermediate chord, and bearing at one end upon said slide, and a bearing member with which the opposite end of the spring is engaged, secured upon the intermediate chord.

11. The combination of claim 10, and means to adjust the bearing member lengthwise of the intermediate chord, to vary the static compression of the spring.

HARRY A. SHAW.